(12) United States Patent
LeBrun et al.

(10) Patent No.: US 7,936,743 B2
(45) Date of Patent: *May 3, 2011

(54) METHOD AND SYSTEM FOR DETERMINING A PATH BETWEEN TWO POINTS OF AN IP NETWORK OVER WHICH DATAGRAMS ARE TRANSMITTED

(75) Inventors: Eric LeBrun, Carros (FR); Arnaud Lund, Cagnes-sur-Mer (FR)

(73) Assignee: International Business Machines Corporation, Armonk, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 12/111,775

(22) Filed: Apr. 29, 2008

(65) Prior Publication Data

US 2008/0198767 A1 Aug. 21, 2008

Related U.S. Application Data

(63) Continuation of application No. 10/809,576, filed on Mar. 25, 2004, now Pat. No. 7,385,937.

(30) Foreign Application Priority Data

Jul. 23, 2003 (FR) .................................... 03 368071

(51) Int. Cl.
H04L 12/28 (2006.01)
(52) U.S. Cl. ........................................................ 370/351
(58) Field of Classification Search .................. 370/392, 370/468, 254, 241, 395, 351, 389, 412, 400, 370/352, 401, 397, 95, 353; 709/227, 229, 709/203, 228, 224, 202, 236, 245, 223; 455/432, 455/428, 445, 466, 41; 707/101, 201, 10, 8; 717/136; 701/1

See application file for complete search history.

(56) References Cited

U.S. PATENT DOCUMENTS

| | | | | |
|---|---|---|---|---|
| 5,652,911 | A | * | 7/1997 | Van Venrooy et al. ............. 701/1 |
| 5,822,523 | A | * | 10/1998 | Rothschild et al. ........... 709/236 |
| 6,003,084 | A | * | 12/1999 | Green et al. ................... 709/227 |
| 6,222,842 | B1 | * | 4/2001 | Sasyan et al. ................. 370/397 |
| 6,253,369 | B1 | * | 6/2001 | Cloud et al. ................... 717/136 |
| 6,389,420 | B1 | * | 5/2002 | Vahalia et al. .................... 707/8 |
| 6,470,389 | B1 | * | 10/2002 | Chung et al. .................. 709/227 |
| 6,779,017 | B1 | * | 8/2004 | Lamberton et al. ........... 709/203 |
| 7,010,590 | B1 | | 3/2006 | Munshi |

(Continued)

OTHER PUBLICATIONS http://www.alltheweb.com/search?cat=web&cs=utf8 &q=%22spoofing+source%22+%22n...dated Jan. 29, 2008.

(Continued)

*Primary Examiner* — Pankaj Kumar
*Assistant Examiner* — Prenell P Jones
(74) *Attorney, Agent, or Firm* — Christopher & Weisberg, P.A.

(57) ABSTRACT

A system, computer program and method to determine a transmission path of a datagram in an IP network from a source device to a destination device. The source device sends a datagram to an IP network device along the transmission path to the destination device. The datagram comprises as destination address, the IP address of the destination device and as source address, the IP address of the network manager station. Consequently, replies, if any, to the datagram are sent back directly to the network manager station by the IP network device along the transmission path, bypassing the source device.

18 Claims, 7 Drawing Sheets

U.S. PATENT DOCUMENTS

| | | | |
|---|---|---|---|
| 7,085,306 | B1 | 8/2006 | Voldman et al. |
| 7,088,706 | B2 | 8/2006 | Zhang et al. |
| 7,149,537 | B1 * | 12/2006 | Kupsh et al. .................. 455/466 |
| 7,151,770 | B1 * | 12/2006 | Clark ............................ 370/352 |
| 7,159,050 | B2 | 1/2007 | Miyata et al. |
| 7,466,703 | B1 * | 12/2008 | Arunachalam et al. ....... 370/392 |
| 2002/0073225 | A1 | 6/2002 | Dillon et al. |
| 2003/0123481 | A1 | 7/2003 | Neale et al. |
| 2004/0185777 | A1 * | 9/2004 | Bryson ....................... 455/41.1 |
| 2005/0089016 | A1 | 4/2005 | Zhang et al. |
| 2006/0195597 | A1 * | 8/2006 | Shaked et al. ................ 709/229 |

OTHER PUBLICATIONS http://www.alltheweb.com/search?advanced=1&cat=web&jsact=&_stype=norm&type=all...dated Jan. 29, 2008.

* cited by examiner

METHOD AND SYSTEM FOR DETERMINING A PATH BETWEEN TWO POINTS OF AN IP NETWORK OVER WHICH DATAGRAMS ARE TRANSMITTED

CROSS-REFERENCE TO RELATED APPLICATION

This application is a continuation of patent application Ser. No. 10/809,576, filed Mar. 25, 2004, entitled METHOD AND SYSTEM FOR DETERMINING A PATH BETWEEN TWO POINTS OF AN IP NETWORK OVER WHICH DATAGRAMS ARE TRANSMITTED, and is related to French Application Serial No.: 03368071.1, filed Jul. 23, 2003 the entirety of all which are incorporated herein by reference.

STATEMENT REGARDING FEDERALLY SPONSORED RESEARCH OR DEVELOPMENT n/a

BACKGROUND OF THE INVENTION

The present invention relates generally to computer networks, and more particularly with a method, system and computer program for determining the transmission path of a datagram sent between two points of an Internet Protocol (IP) network.

Internet

The Internet is a global network of computers and computers networks which connects computers that use a variety of different operating systems or languages, including UNIX, DOS, Windows, Linux and Macintosh. To facilitate and allow the communication among these various systems and languages, the Internet uses a language referred to as TCP/IP ("Transmission Control Protocol/Internet Protocol"). TCP/IP protocol supports the following functions on the Internet:
   transmitting and receiving electronic mail,
   logging into remote computers ("Telnet"), and
   transferring files and programs from one computer to another ("FTP" or "File Transfer Protocol").

TCP/IP

The TCP/IP protocol suite is named for two of the most important protocols:
   a Transmission Control Protocol (TCP), and
   an Internet Protocol (IP).
The first design goal of TCP/IP is to build an interconnection of networks that provides universal communication services: an "internetwork", or "internet". Each physical network has its own technology dependent communication interface in the form of a programming interface that provides basic communication functions running between the physical network and the user applications. The architecture of the physical networks is hidden from the user. The second design goal of TCP/IP is to interconnect different physical networks to form what appears to the user to be one large network. TCP is a transport layer protocol providing end to end data transfer. It is responsible for providing a reliable exchange of information between two computer systems. Multiple applications can be supported simultaneously over one TCP connection between two computer systems. IP is an internetwork layer protocol hiding the physical network architecture bellow it. Part of the task of communicating messages between computers is routing that ensures that messages will be correctly directed within the network to their destination. IP provides this routing function. An IP message is called an IP Datagram. Application Level protocols are used on top of TCP/IP to transfer user and application data from one origin computer system to one destination computer system. Such Application Level protocols are for instance File Transfer Protocol (FTP), Telnet, Gopher, Hyper Text Transfer Protocol (HTTP).

World Wide Web

With the increasing size and complexity of the Internet, tools have been developed to help find information on the network, often called navigators or navigation systems. Navigation systems that have been developed include standards such as Archie, Gopher and WAIS. The World Wide Web ("WWW" or "the Web") is a recent superior navigation system. The Web is:
   an Internet-based navigation system,
   an information distribution and management system for the Internet, and
   a dynamic format for communicating on Internet.
The Web seamlessly integrates format of information, including still images, text, audio and video. A user on the Web using a graphical user interface may transparently communicate with different host computers on the system, different system applications (including FTP and Telnet), and different information formats for files and documents including, for example, text, sound and graphics.

IP Router

One of the basic functions of IP is its ability to form connections between different physical networks. This is due to the flexibility of IP to use almost any physical network below it, and to the IP routing algorithm. A system that builds connections between networks is termed a "router". A "router" is a computer that interconnects two networks and forwards messages from one network to the other. Routers are able to select the best transmission path between networks. The basic routing function is implemented in the IP layer of the TCP/IP protocol stack, so any host (or computer) or workstation running TCP/IP over more than one interface could, in theory, forward messages between networks. Because IP implements the basic routing functions, the term "IP Router" is often used. However, dedicated network hardware devices called "routers" can provide more sophisticated routing functions than the minimum functions implemented in IP.

IP Routing

When data is sent to a remote destination, each IP datagram is first sent to a local router. An incoming datagram that specifies a destination IP address other than one of the local router IP address is treated as a normal outgoing datagram. This outgoing datagram is subject to the IP routing algorithm of the router, which selects the next hop for the datagram. The router forwards each datagram towards its final destination. A datagram travels from one router to another until it reaches a router connected to the destination. Each intermediate router along the end-to-end path selects the next hop used to reach the destination. The next hop represents the next router along the path to reach the destination. This next router can be located on any of the physical networks to which the intermediate router is attached. If it is a physical network other than the one on which the host originally received the datagram, then the result is that the intermediate router has forwarded the IP datagram from one physical network to another. An "IP routing table" in each router is used to forward datagrams between networks. A basic IP routing table comprises information about the locally attached networks and the IP addresses of other routers located on these networks, plus the networks to which they attach. A routing table can be extended with information on IP networks that are farther away, and can also comprise a default route, but it still remains a table with limited information. A routing table represents only a part of the whole IP networks. A router having such a routing table is called "a router with partial routing information". A robust routing protocol must provide the ability to dynamically build and manage information in the IP routing table. As the changes in the network topology may occur, the routing tables must be updated with minimal or without manual intervention.

IP Path

When a datagram is sent to a remote destination, the succession of hops that the datagram flow through, form an "IP path". The determination of the IP path is essential to understand how the datagram reaches its final destination when sent from an origin end point. Common network problems arise when the path is "broken", that means when one (or more) intermediate router along the path is not able to properly forward datagrams to the next hop. To fix such a network problem, it is necessary, first, to isolate the problem and then, to identify the first hop that does not perform any more the routing function along the path.

Path Determination

The problem is therefore to find a way to determine the path that a datagram takes when this datagram is transmitted between two points of an IP network. The point of the network at the origin of the path to identify can be called "source host", and the point of the network at the end of this path, can be called "destination host". In many cases, routing problems occur between a client who tries to access resources located on a remote server. The object of the present invention is to locate network problems between a source and a destination host, by identifying the IP path between this source and destination hosts and determining where this path is broken. Usually, in corporate networks, users do not investigate problems by themselves, and even if they do so, they would not have sufficient authority and control over the network to fix the problem. In most of the cases, users call a help desk, and the investigation of problems is done by a person named "Network Manager". This Network Manager is generally in a remote location and has enough authority to fix the network problem. The first task of the Network Manager is to isolate the problem and determine exactly where the path is broken.

Traceroute

A tool commonly used today in networks to troubleshoot connectivity problems, is a software application called "traceroute". The traceroute application enables the determination of the route that datagrams follow from a source to a destination host. Traceroute is based upon UDP (User Datagram Protocol) and ICMP (Internet Control Message Protocol). Traceroute sends a series of "probe datagrams" using UDP to an IP address and waits for an ICMP reply. A first datagram with a "Time to Live" (TTL) of "one" is sent to the destination point. The first router to see the datagram decrements the TTL to zero and returns an ICMP "time exceeded" message. The datagram is discarded. In this way, the first router in the path is identified. This process is then repeated with successively larger TTL values in order to identify the series of routers in the path to the destination host. Each router through which the datagram passes similarly decrements the TTL by one, and when a router decrements the TTL to zero, it returns the ICMP message. If a datagram which is sent out does not elicit the expected ICMP reply, then the location of the break in the path can be determined by the TTL of this datagram, and the record of the other datagrams (with lower TTL values) for which the ICMP replies were received. Traceroute actually sends UDP datagrams to the destination point which reference a port number that is outside the normally used range. This enables traceroute to determine when the destination host has been reached, that is when an ICMP "port unreachable" message is received. In other terms, UDP datagrams are sent with monotonically increasing values in the "Time To Live" (TTL) field, and the chosen UDP port is one most likely not to be in use. For each TTL value, the traceroute program sends a fixed number of datagrams (usually three), and receives the IP addresses of the routers responding. This process continues until an ICMP "port unreachable" datagram is received or some TTL threshold is reached (usually thirty). If a router receives an IP datagram and decrements the TTL to zero, then it returns an ICMP "time exceeded" message. If the IP datagram eventually reaches the destination host, an ICMP "port unreachable" message is returned. Combining the information from all the replies the traceroute program can report the whole route.

Investigating network problems is a very common task devoted to Network Managers. A typical situation is when network equipment (for example, a customer's workstation) cannot reach network equipment (for example, a server). The end user (e.g. the customer) will call a help desk, (typically the Network Manager) in charge of investigating and resolving the problem. The problem for the Network Manager is to perform the investigation of the failure remotely; usually the Network Manager is far away from the customer's workstation. Tivoli and the Netview console are typical tools for remotely investigating a problem on a network (Tivoli and Netview are trademarks of IBM Corporation). These tools give a view of the network, and of the status of the connections between neighbor network nodes. The availability of the ports on the network nodes is continuously monitored. A failure on a port will be immediately reported on the monitoring screen, and the Network Manager will be informed of the problem. However, a port failure represents only one type of problem among all the problems that can cause a connection failure. Other problems (such as routing table problems in routers) cannot be detected using this type of tools. This is why the traceroute application is helpful for investigating on a connection failure. By determining the actual path that is used by the datagrams in the network, and by indicating where this path is broken, traceroute allows a fast problem determination and failure isolation.

However, the usage of the traceroute application suffers from a major drawback. To execute a program such as traceroute on a computer or a system, the Network Manager needs to take control of the source host, either directly or remotely (remote logon). This implies the definition and usage by the Network Manager of passwords to take the control of the end user's workstation. The problem is that the end user (for example, the customer), may not want a third person to have access to his or her workstation for reason of confidentiality. The access by the Network Manager to a customer's workstation may be considered as an intrusion.

SUMMARY OF THE INVENTION

The present invention advantageously provides a method, computer readable storage medium and computer system for determining a transmission path of a datagram in an IP network. Generally, the present invention determines the transmission path by sending a datagram from a source device to a destination device along a transmission path. The destination device sends a reply to the datagram directly to a network manager station, bypassing the source device.

One aspect of the present invention provides a method for determining a transmission path of a datagram sent from a source device to a destination device in an IP network. The IP network includes an IP network device along a transmission path from the source device to the destination device. The datagram is sent from the source device to the IP network device. The datagram has an IP address of the destination device included as a destination address, and an IP address of a network manager station included as a source address. The IP network device replies to the datagram by sending a reply directly to the network manager station, bypassing the source device.

In accordance with another aspect, the present invention provides a computer readable storage medium for determining a transmission path of a datagram in an IP network from a source device to a destination device. The computer readable storage medium includes first program instructions, executable at a network manager station, to receive replies, if any, to a datagram. The replies are sent back directly to the network manager station by a respective IP network device along the transmission path, bypassing the source device. The first program instructions are recorded on the storage medium.

In accordance with still another aspect of the present invention, a computer system, which includes a network manager station, determines a transmission path of a datagram in an IP network from a source device to a destination device. The network manager station sends a message to the source device in order to retrieve information related to the transmission path of the datagram from the source device to the destination device. The datagram is sent to an IP network device along the transmission path to the destination device. The datagram has an IP address of the destination device included as the destination address, and an IP address of said network manager station included as a source address. The message includes a destination address and a source address, wherein the destination address is the IP address of the destination device, and the source address is the IP address of said network manager station. The network manager station also receives replies to the datagram. The replies are sent back directly to the network manager station by the respective IP network device along the transmission path, bypassing the source device. The network manager station also determines a failure location in the transmission path based on the replies to respective datagrams and the absence of a reply to said datagram.

DETAILED DESCRIPTION OF THE INVENTION

Figure 1:
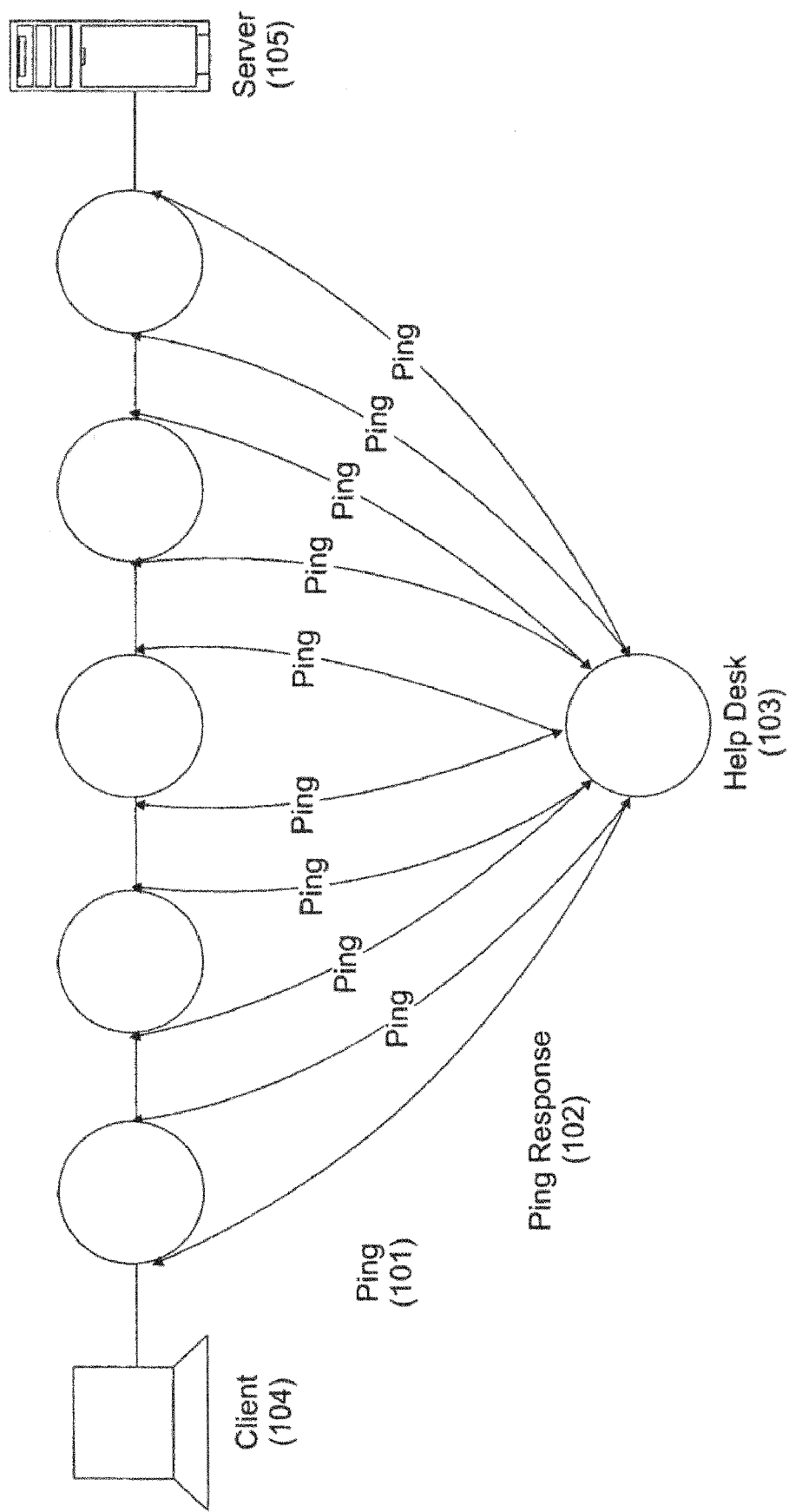
FIG. 1 shows a prior art technique used by Network Managers to monitor the availability of networks by testing the interfaces of network devices.

Path Determination Between a Client and a Server from a Network Manager

The present invention determines the transmission path of a datagram between two points in the network such as between a source host and a destination host or between a client station and a server. This determination is made from a point, such as a Network Management device or station, which is distant from the source host and client station. The present invention determines the transmission path without having to take control of the source host (client station) or manage remote logons (authorization, access lists, passwords, access control, etc. . . ). In the following description, the source, destination and Network Management devices are named "client station", "server station" and "Network Manager Station", respectively. However, these names should not be interpreted as limiting, and in other embodiments of the invention, other types of devices may be used. The method for determining the transmission path of a datagram in a network and detecting a failure on this path according to the present invention comprises the following steps:

The Network Manager station sends a message (IP datagram) to the client station (source host) to determine the path between this client station and a server station (destination host). This message comprises the IP address of the server station.

the client station receives the message sent by the Network Manager station and retrieves from this message the following information:

the IP address of the server station (destination host);

the IP address of the Network Manager station (source IP address of the incoming message);

the client station then sends, using UDP (User Datagram Protocol), a series of "datagrams" to the IP address of the server station (destination host). IP datagrams carrying the UDP datagrams are sent with monotonically increasing values in the "time to live" (TTL) field of the IP header. For each TTL value, a fixed number of datagrams are sent. However instead of inserting in each outgoing datagram, its own source address (client station IP address), the client station inserts the IP address of the Network Manager station as source address. This operation is called "spoofing".

If a router receives one of the IP datagrams sent by the client station and decrements the TTL to zero, then this router returns an ICMP (Internet Control Message Protocol) "time exceeded" datagram. The datagram returned is sent back according to the source address of the datagram. In this case, the returned datagram is directly sent back to the Network Manager station, because of the spoofing technique described in the previous paragraph.

If an IP datagram sent by the client station, eventually reaches the server station (destination host), an ICMP "port unreachable" datagram is returned to the Network Manager station.

In the meantime the Network Manager station, combining the information from all the replies, can report the whole route up to the point where the first network failure occurs.

Network Monitoring Using Ping Application

There are two simple and widely used applications that are based on ICMP—Ping and Traceroute. Ping uses the ICMP Echo and Echo reply messages to determine whether a host is reachable. Ping is the simplest of all TCP/IP applications. It sends one or more IP datagrams to a specified destination host requesting a reply and measures the round trip time.

FIG. 1 shows a prior art method based on the Ping application to monitor, from a remote Network Manager station (103), the availability of a network connection between a client station (104) (source host) and a server station (105) (destination host). This method comprises the following steps:

From its work station, the Network Manager (Help Desk) (103) sends a probe IP datagram called "ping" (more properly named "Echo Request") towards each physical interface (port) of the network devices located on the path that the Network Manager wants to verify (101).

Upon reception of this datagram (if the interface is operational), each network device sends back a reply (sometimes called "Ping Response" but more properly named "Echo Reply") (102).

The Network Manager station waits for the network devices' replies. A reply is received when the network device is operational. In case of failure, no reply is received and the Network Manager station displays a "timeout" message after a given period of time.

By checking all individual interfaces along the path, the Network Manager can know whether or not the interfaces are working properly. However, this method has some drawbacks. In complex networks, the path taken by datagrams between a client station and a server station is not always known. Many different paths can be taken, and the selected path depends on complex IP routing mechanisms. Furthermore, the path can be chosen dynamically, if a dynamic routing protocol is used. Thus, it is sometimes difficult to correlate an interface failure with a connection problem, i.e. the interface failure can be unrelated to the problem when for instance this failure is not on the path. It is absolutely necessary to determine the path before verifying whether or not the interfaces along said path are working properly. In addition, a connection may be broken at a logical level while all physical interfaces are operational. If, for example, the routing function of one of the intermediate network devices along the path is not properly working, datagrams may be lost, although all interfaces are correctly working. This is the reason why, it is very useful to have means to determine the path that is actually used by the datagram flow.

Determination of a Datagram Path with Traceroute

Figure 2:
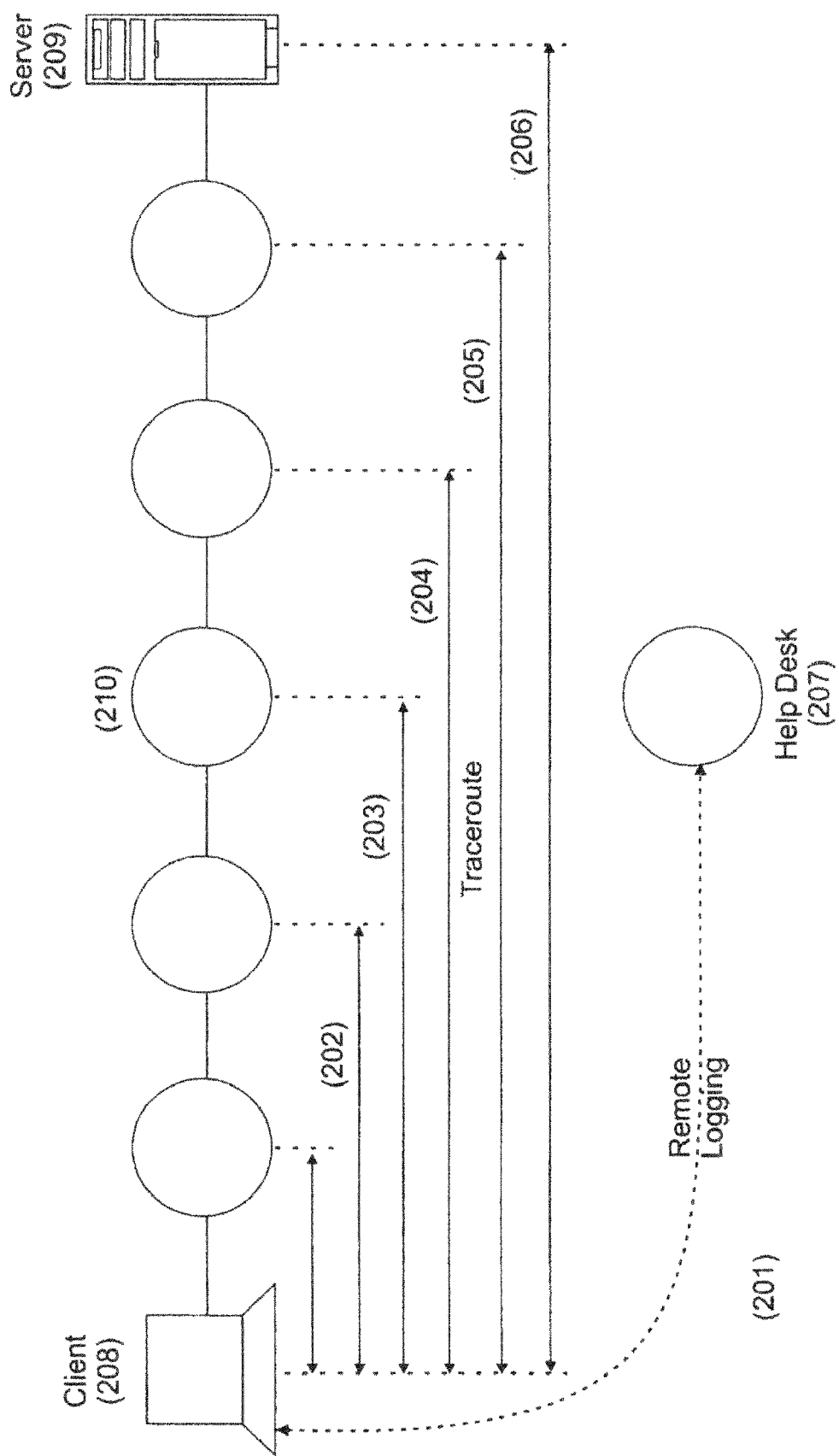
FIG. 2 shows a prior art technique used by Network managers to determine the path between two points of a network.

FIG. 2 shows a prior art method based on the traceroute application used by Network Managers to determine the path used by a datagram sent by a client to a server. The Network Manager first takes control of the client station with a remote login (101). Then, the Network Manager launches in the client station, the traceroute program. As described earlier, the traceroute program sends probe datagrams along the path leading to the server station (209), causing each of the intermediate network devices (nodes, routers, . . . ) (210) to send back a reply ((202) to (206)). The client station (208) gathers the replies sent by the network devices, determines the entire path and transmits the information to the Network Manager (Help Desk) (207).

Failure on the Path between Client and Server

Figure 3:
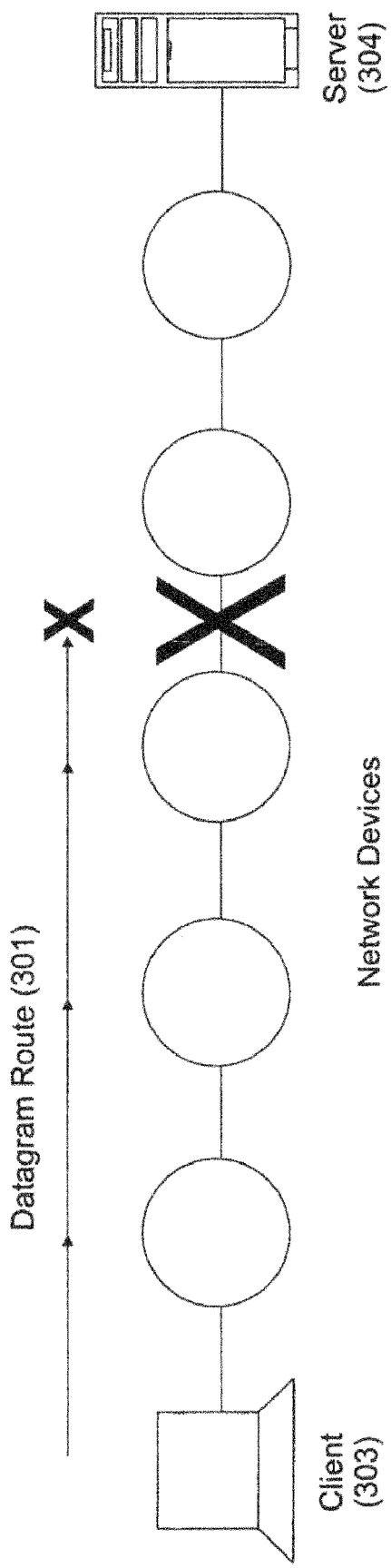
FIG. 3 shows a typical, prior art situation where a client device tries to connect to a server through a network having a failure on a connection.

FIG. 3 shows a typical, prior art situation where a client station (303) tries to reach a server station (304) without success due to a failure in the network. The path taken by the datagram is symbolized by the arrows (301). This path is interrupted at the point (302) where the network is broken. At this point, datagrams cannot be further transmitted.

Failure Investigation with Traceroute

Figure 4:
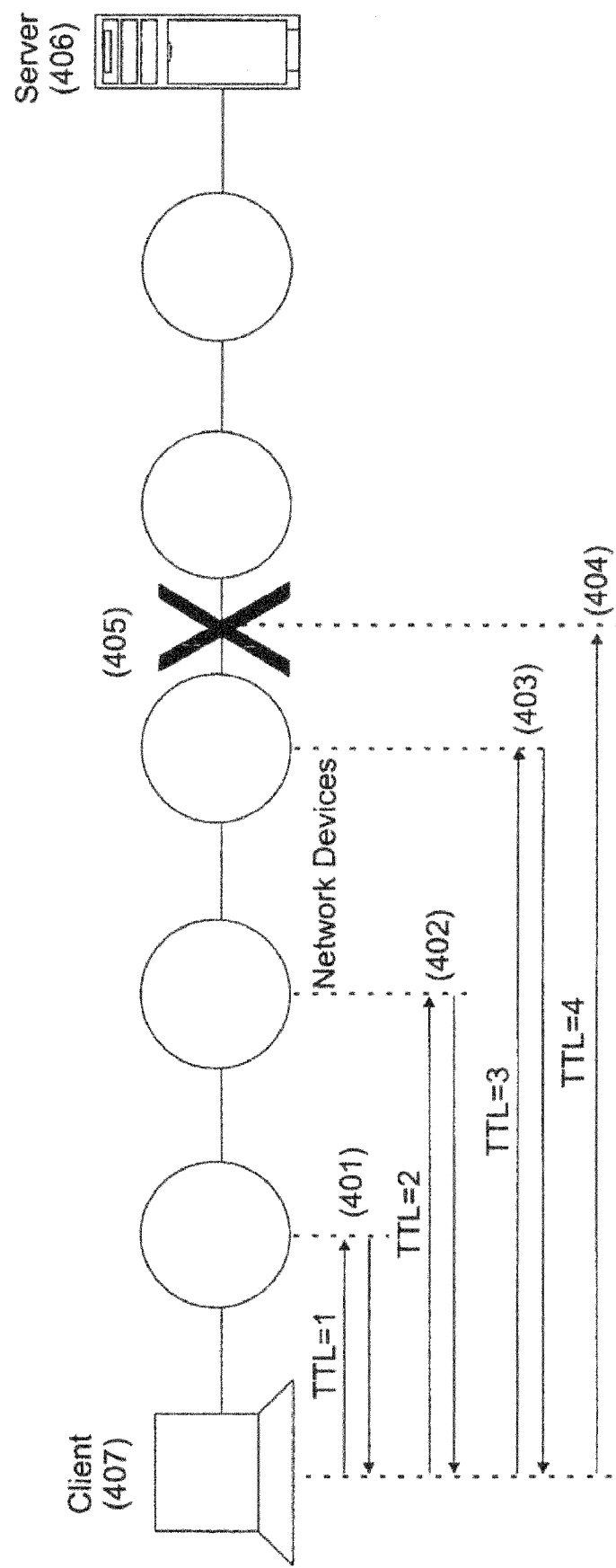
FIG. 4 shows how a prior art traceroute program determines the path from a client towards a server and locates the first failure along this path.

FIG. 4 shows how the traceroute application operates to investigate a failure in a network according to prior art.

Probe datagrams are sent by the client station towards the server station.

Intermediate network devices (nodes, routers, . . . ) reply to the client station, up to the network failure (401 to 403).

The client station collects the replies and determines the network path up to the network failure.

The last datagram sent by the client station, reaches the network failure and is lost. No reply (404) is sent back to the client station. After a predefined time period, the client station presumes that a network failure is present just after the path partially identified. The information is forwarded to the Network manager which can easily and quickly locate the failure.

Spoofing Technique

Figure 5:
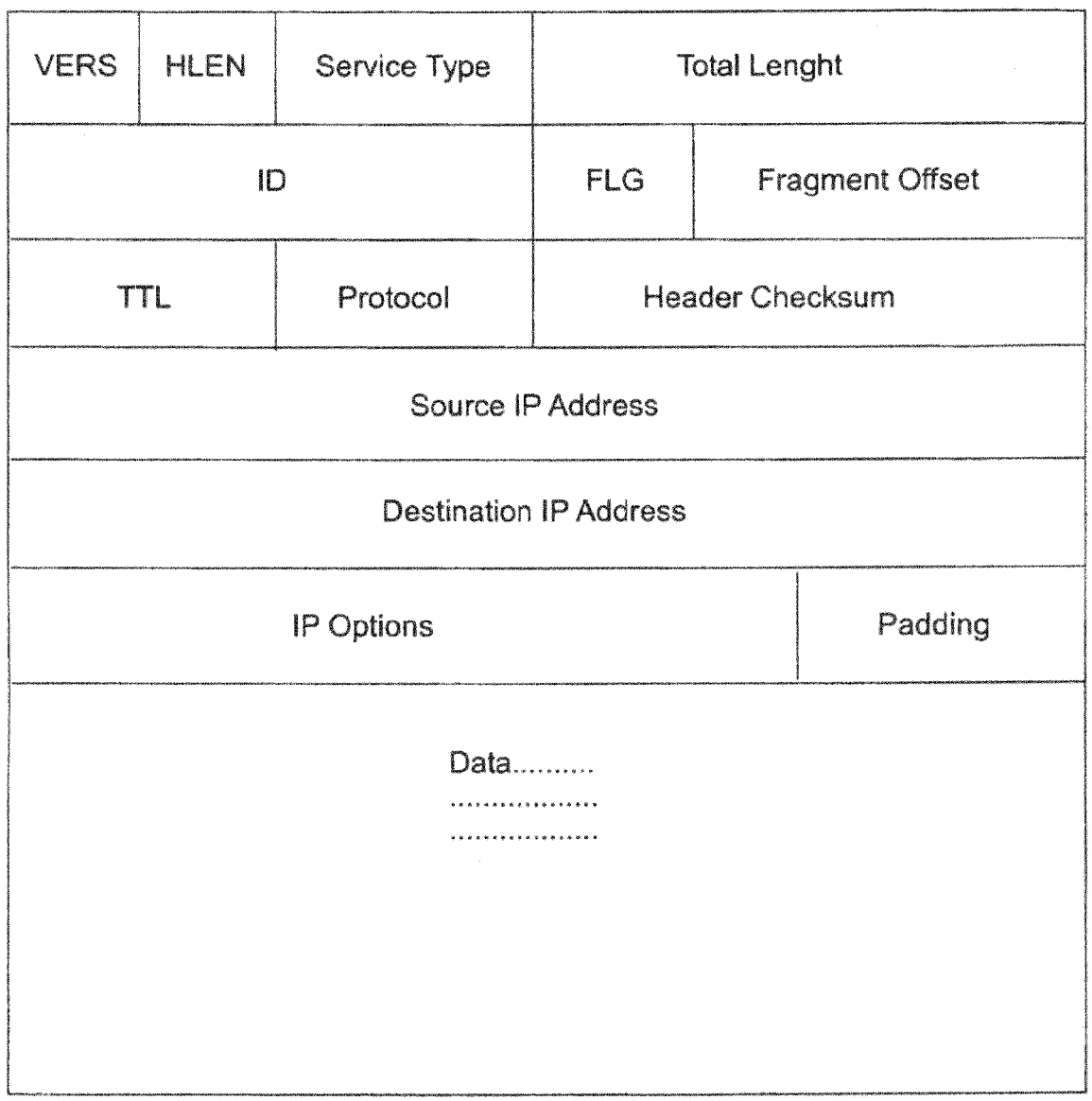
FIG. 5 shows the structure of a prior art IP header layout of an IP datagram, said IP header comprising TTL and source address fields.

FIG. 5 shows the structure of an IP datagram header. The fields in the IP header mean the following:

VERS: This field identifies the IP protocol version.

HLEN: The length of the IP header counted in 32-bit quantities. This length does not include the data field.

Service Type: The service type is an indication of the quality of service (QoS) requested for the IP datagram.

Total Length: The total length of the datagram, header and data.

Identification: A unique number assigned by the sender to aid in reassembling a fragmented datagram. Each fragment of a datagram has the same identification number.

Flags: This field comprises control flags

Fragment Offset: This field is used to aid in reassembling the full datagram. The value of this field is the number of 64-bit segments (header bytes are not counted) that are contained in earlier fragments. If this is the first (or only) fragment, this field has a value of zero.

Time to Live (TTL): This field specifies the maximum time period (in seconds) during which the datagram can travel. Theoretically, each router processing this datagram is supposed to subtract its processing time from this field. In practice, a router processes the datagram in less than one second. Thus the router subtracts one from the value indicated in this field. The TTL has become a hop-count metric rather than a time metric. When the value reaches zero, it is assumed that this datagram is traveling in a closed loop and is discarded. The initial value should be set by the higher level protocol that creates the datagram.

Protocol Number: This field indicates the higher level protocol to which IP should deliver the data in this datagram.

Header Checksum: This field is a checksum for the information contained in the header. If the header checksum does not match the contents, the datagram is discarded.

Source IP Address: The 32-bit IP address of the host sending this datagram.

Destination IP Address: The 32-bit IP address of the destination host for this datagram.

Among the IP header fields described here above, the source address is different in the present invention. In the prior art, this address is normally the IP address of the device that has originated the datagram. This IP address is used by a number of programs which need to know the origin of the datagrams. For example, a program which needs to send a message of error back to the originator of the datagram will use this IP address. This is the case with the error message sent back when the time to live field (TTL) reaches zero. This mechanism is used by the traceroute application, in particular, to collect the replies to its probe datagrams. However, in accordance with the present invention, the "spoofing" technique consists of changing the source IP address of the datagram to make the programs processing the datagram think that the origin of the datagram is different than what it is in reality. The error messages are sent back to the new spoofed address and not to the real originator (source host) of the datagram.

Figure 6:
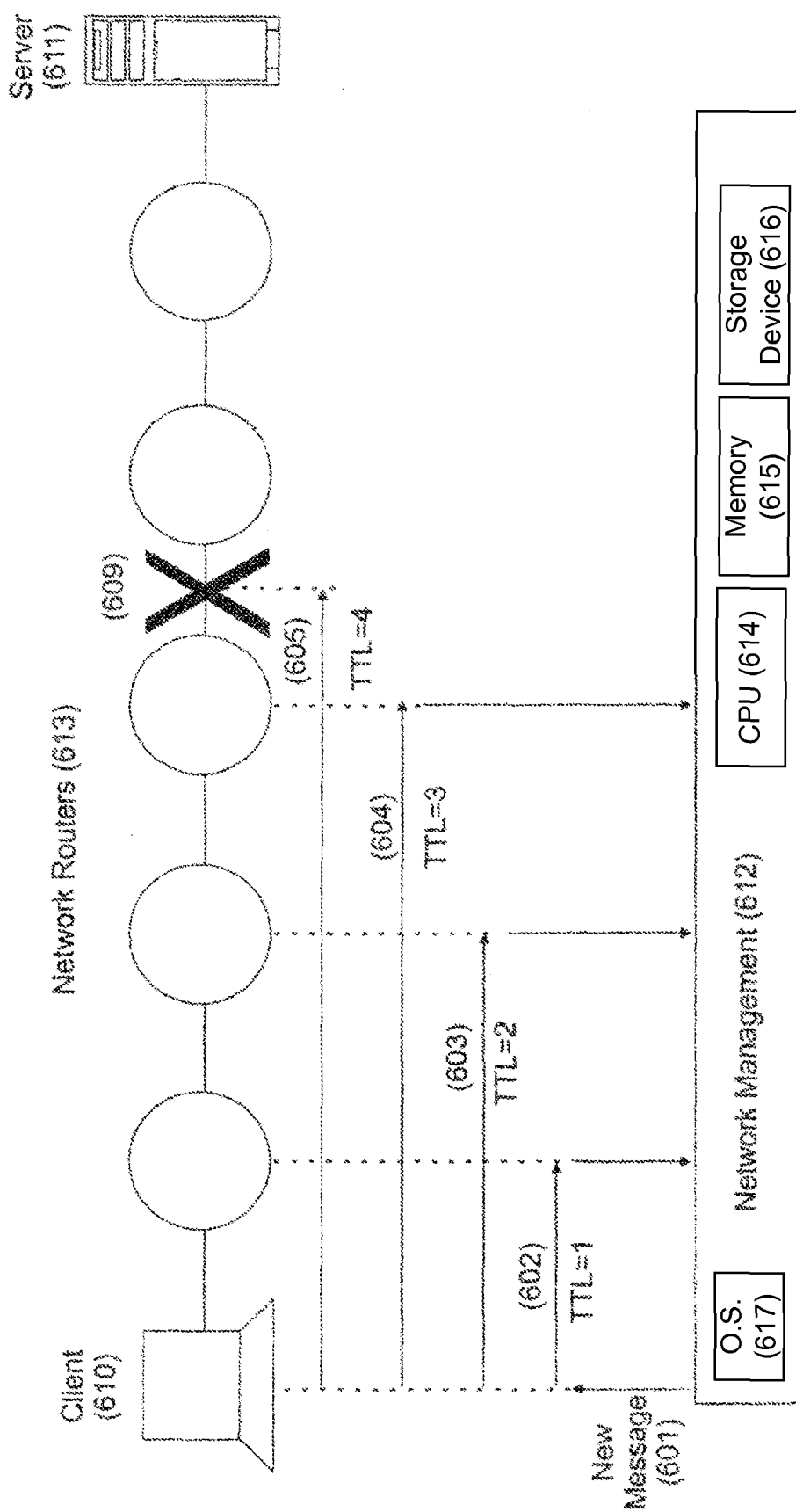
FIG. 6 shows how the path between the client and the server and the position of the first network failure along the path are determined and how the information is sent back to the Network Manager according to the present invention.

Method for Determining the Path and the Failure Along the Path According to the Present Invention FIG. 6 shows how the path between the client station (610) and the server station (611) and the position of the first failure (609) along the path are determined. FIG. 6 also shows how the information is sent back to the Network Manager station (612) according to the present invention. The method of the present invention comprises the following steps:

The Network Manager station (612) includes a CPU (614), a memory (615), a storage device (616), e.g., hard drive, and an operating system (617). As is common in the art, the operating system (617) can be stored on the storage device (616) and/or the memory (615). A message (601) is sent from the Network Manager station (612) by computer programming instructions stored on a computer-readable, tangible storage device (616) for execution by the CPU (614) and operating system (617) via computer readable memory (615) within the Network Manager station, to the client station (610) to launch the process.

Upon receipt of the message (601) sent by the Network Manager station, the client station (including computer programming executing within the client station) sends probe datagrams toward the server station (611) with increasing TTL values similarly to the traceroute program (602 to 604). These probe datagrams (using the "spoofing" technique) include, as source address, the IP address of the Network Manager station (instead of the IP address of the client station).

The intermediate routers (613) send their replies back (when TTL=0) according to the traceroute program described above. However, because the intermediate routers rely on the spoofed address inserted in the probe datagrams, the replies (606 to 608) are sent back directly to the Network Manager station.

The replies are collected by computer programming instructions stored on the computer-readable, tangible storage device (616) for execution by the CPU (614) and operating system (617) via the computer readable memory (615) within the Network Manager station, which determines the first part of the path up to the network failure (or the complete path up to the server station if there is no network failure).

The last probe datagram (605) sent by the client station (610) reaches the network failure (609) and is lost. The Network Manager station is then able to display the network path up to the network failure (609).

Figure 7:
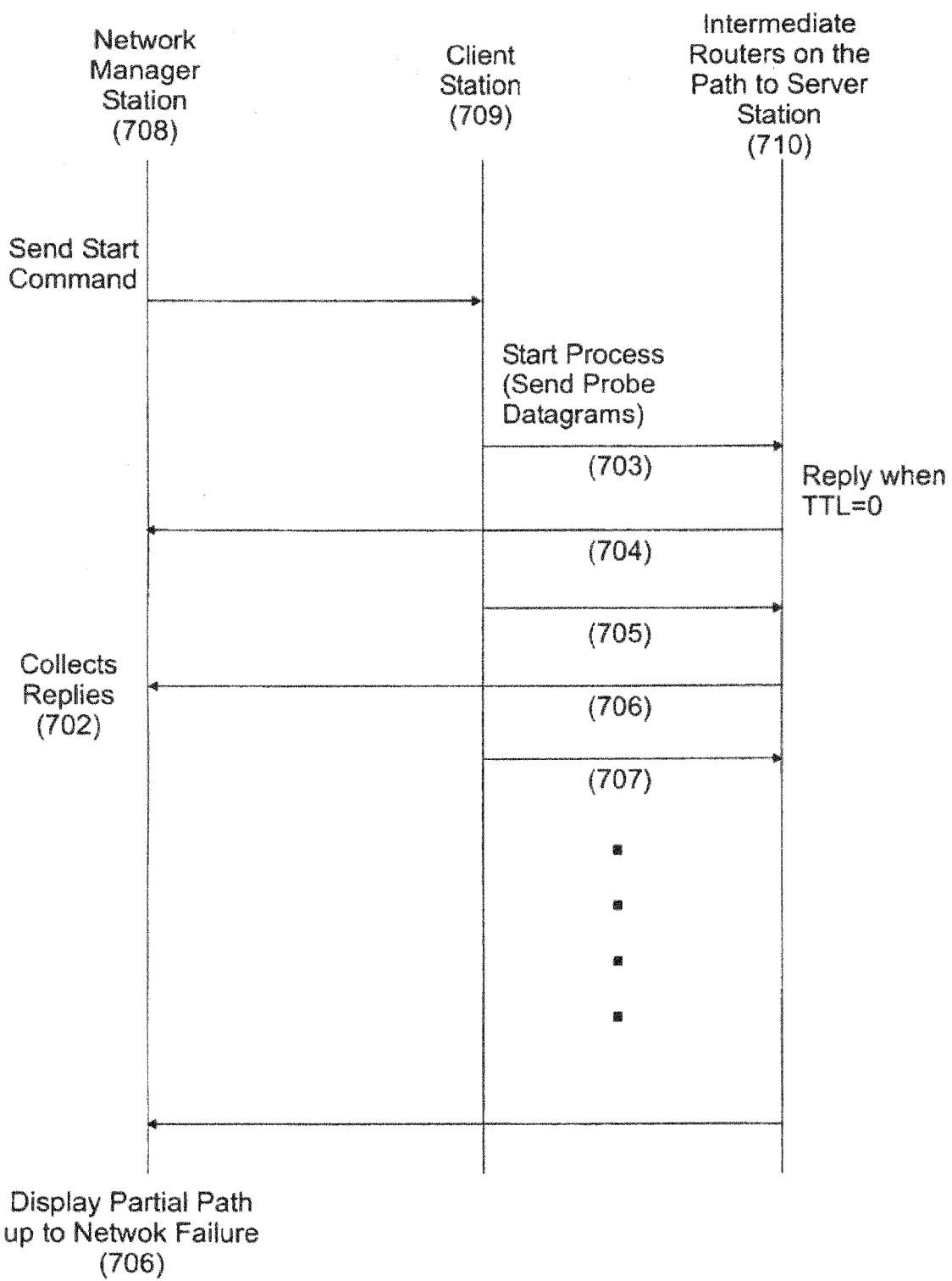
FIG. 7 is a flow chart showing the transfer of information between the different network devices (source and destination devices, routers along the IP path) and the Network Manager according to the present invention.

FIG. 7 is a flow chart of the foregoing process showing the interaction between the various components of the network.

The Network Manager station (708) sends a command (701) to the client station (709) to start the process and then waits for the replies (702) sent back by routers (702).

The client station (709), upon receipt of the start command (701), sends the probe datagrams (703 705 707 etc. . . ) with as source address, the spoofed address of the Network Manager station (708) and as destination address, the IP address of the server station.

The intermediate routers (710) reply back directly to the Network Manager station (704, 706, etc. . . ) when the TTL=0.

The replies (702) are collected by the Network Manager station.

A the end of the process, the Network Manager station (708) displays (706) the path that has been computed based on the replies sent by the routers (710).

While the invention has been particularly shown and described with reference to a preferred embodiment, it will be understood that various changes in form and detail may be made therein without departing from the spirit, and scope of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for determining a transmission path of a datagram in an IP network sent from a source device to a destination device, the IP network including an IP network device along a transmission path from the source device to the destination device, the method comprising the steps of:
   a network manager station sending to the source device a message for retrieving information related to the transmission path of the datagram, the datagram comprising a destination address and a source address, the destination address being the IP address of the destination device, and the source address being the IP address of the network manager station, the datagram being sent from the source device to the IP network device; and
   the network manager station receiving, from the IP network device a reply to the datagram, bypassing the source device, the network manager station being different from the destination device.

2. The method according to claim 1 further comprising the steps of the source device inserting a value in the datagram sent to the IP network device to cause the respective IP network device to reply to the network manager station.

3. The method according to claim 2, wherein the step of inserting a value in the datagram sent to the respective IP network device comprises the step of inserting the value in a "time to live" (TTL) field of an IP header of the datagram, the value being decremented by each IP network device along the transmission path.

4. The method according to claim 1, wherein the datagram fully complies with a traceroute protocol except the source address in the IP header is replaced by the IP address of the network manager station.

5. The method according to claim 1, wherein the IP network device is an IP router.

6. The method according to claim 1, wherein the destination device is a server station; and the source device is a client station.

7. A computer program product for determining a transmission path of a datagram in an IP network from a source device to a destination device, the computer program product comprising:
   a computer readable, tangible storage device;
   first program instructions, for execution at a network manager station, to send to the source device a message to retrieve information related to the transmission path of the datagram, the datagram being sent to an IP network device along the transmission path, the datagram comprising a destination address and a source address the destination address being the IP address of the destination device, and the source address being the IP address of the network manager station; and
   second program instructions, for execution at a network manager station, to receive replies, if any, to the datagram, the replies being sent back directly to the network manager station by a respective IP network device along the transmission path, bypassing the source device; and wherein
   the first program instructions and second program instructions are recorded on the computer readable, tangible storage device.

8. The computer program product according to claim 7, wherein the datagram comprises respective values in a field to cause the respective IP network device to reply to the network manager station.

9. The computer program product according to claim 8, wherein the value in the datagram is a "time to live" (TTL) value in a TTL field, the value being decremented by each IP network device along the transmission path.

10. The computer program product according to claim 7, wherein the datagram fully complies with a traceroute protocol except the source address in an IP header is replaced by the IP address of the network manager station.

11. The computer program product according to claim 7 wherein the IP network devices are IP routers.

12. The computer program product according to claim 7, further comprising:
   third program instructions, for execution in the network manager station, to determine a failure location in the transmission path based on the reply to respective datagram, and absence of a reply to the datagram; and wherein
   the third program instructions are recorded on the computer readable, tangible storage device.

13. A computer system for determining a transmission path of a datagram in an IP network from a source device to a destination device, said computer system comprising:
   a network manager station containing a central processing unit (CPU), a computer-readable memory, and a computer-readable, tangible storage device;
   first program instructions for sending, from the network manager station to the source device, a message to retrieve information related to the transmission path of the datagram, the datagram being sent to an IP network device along the transmission path, the message comprising a destination address and a source address, the destination address being the IP address of the destination device, and the source address being the IP address of the network manager station;
   second program instructions for receiving replies, if any, at the network manager station, to the datagram, the replies being sent back directly to the network manager station by a respective IP network device along the transmission path, bypassing the source device; and
   third program instructions, for determining, by the network manager station, a failure location in the transmission path based on the reply to respective datagram, and absence of a reply to the datagram,
   the first, second and third program instructions stored on the computer-readable tangible storage device for execution by the CPU via the computer-readable memory.

14. The computer system according to claim 13, wherein the datagram comprises respective values in a field to cause the respective IP network device to reply to the computer system.

15. The computer system according to claim 14, wherein the value in the datagram is a "time to live" (TTL) value in a TTL field, the value being decremented by each IP network device along the transmission path.

16. The computer system according to claim 13, wherein the datagram fully complies with a traceroute protocol except the source address in an IP header is replaced by the IP address of the computer system.

17. The computer system according to claim 13, wherein the IP network device is an IP router.

18. The computer system according to claim 13, wherein:
   the destination device is a server station; and
   the source device is a client station.

* * * * *